(12) United States Patent
Muthusamy et al.

(10) Patent No.: US 9,163,173 B2
(45) Date of Patent: Oct. 20, 2015

(54) WELLBORE SERVICING COMPOSITIONS AND METHODS OF MAKING AND USING SAME

(75) Inventors: Ramesh Muthusamy, Pune (IN); Rahul Chandrakant Patil, Pune (IN); B Raghava Reddy, Duncan, OK (US); Sohini Bose, Pune (IN); Pranjal Sarmah, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 861 days.

(21) Appl. No.: 13/327,158

(22) Filed: Dec. 15, 2011

(65) Prior Publication Data

US 2013/0153223 A1 Jun. 20, 2013

(51) Int. Cl.
| | | |
|---|---|---|
| *C09K 8/467* | (2006.01) | |
| *C04B 28/02* | (2006.01) | |
| *C04B 24/38* | (2006.01) | |
| *C04B 28/06* | (2006.01) | |
| *C04B 28/08* | (2006.01) | |
| *C04B 28/30* | (2006.01) | |
| *C04B 28/34* | (2006.01) | |
| *C04B 103/00* | (2006.01) | |
| *C04B 103/20* | (2006.01) | |

(52) U.S. Cl.
CPC ............... *C09K 8/467* (2013.01); *C04B 24/383* (2013.01); *C04B 28/02* (2013.01); *C04B 28/021* (2013.01); *C04B 28/06* (2013.01); *C04B 28/08* (2013.01); *C04B 28/30* (2013.01); *C04B 28/34* (2013.01); *C04B 2103/0079* (2013.01); *C04B 2103/20* (2013.01)

(58) Field of Classification Search
CPC ........................................................ C09K 8/42
USPC .......................................... 166/294; 507/211
See application file for complete search history.

(56) References Cited

U.S. PATENT DOCUMENTS

| | | |
|---|---|---|
| 5,152,836 A | 10/1992 | Hirano et al. |
| 5,233,032 A | 8/1993 | Zody et al. |
| 5,346,012 A | 9/1994 | Heathman et al. |
| 5,525,148 A | 6/1996 | Chow et al. |

(Continued)

FOREIGN PATENT DOCUMENTS

| | | |
|---|---|---|
| CN | 101524557 A | 9/2009 |
| CN | 102181274 A | 9/2011 |

(Continued)

OTHER PUBLICATIONS

Foreign communication from a related counterpart application—International Search Report and Written Opinion, PCT/US2012/065528, Jan. 30, 2013, 11 pages.

(Continued)

*Primary Examiner* — Angela M DiTrani
*Assistant Examiner* — Avi Skaist
(74) *Attorney, Agent, or Firm* — Craig W. Roddy; Baker Botts L.L.P.

(57) ABSTRACT

A method of servicing a wellbore in a subterranean formation comprising preparing a wellbore servicing fluid comprising cement, an aqueous fluid, and a cyclodextrin, a cyclodextrin derivative, or combination thereof; placing the wellbore servicing fluid in the wellbore and allowing the fluid to set. A wellbore servicing fluid comprising cement, aqueous fluid, and a cyclodextrin, cyclodextrin derivative, or combination thereof.

15 Claims, 6 Drawing Sheets

(56) References Cited

U.S. PATENT DOCUMENTS

| | | | |
|---|---|---|---|
| 5,588,488 | A | 12/1996 | Vijn et al. |
| 5,603,974 | A | 2/1997 | Wood et al. |
| 5,605,713 | A | 2/1997 | Boltong |
| 5,913,364 | A | 6/1999 | Sweatman |
| 6,167,967 | B1 | 1/2001 | Sweatman |
| 6,258,757 | B1 | 7/2001 | Sweatman et al. |
| 6,457,524 | B1 | 10/2002 | Roddy |
| 6,476,169 | B1 | 11/2002 | Eoff et al. |
| 6,511,944 | B2 | 1/2003 | Taylor et al. |
| 6,544,934 | B2 | 4/2003 | Taylor et al. |
| 6,787,038 | B2 * | 9/2004 | Brusseau et al. ............. 210/634 |
| 6,881,709 | B2 | 4/2005 | Nelson et al. |
| 6,908,888 | B2 | 6/2005 | Lee et al. |
| 7,077,203 | B1 | 7/2006 | Roddy et al. |
| 7,081,439 | B2 | 7/2006 | Sullivan et al. |
| 7,174,962 | B1 | 2/2007 | Roddy et al. |
| 7,182,136 | B2 | 2/2007 | Dalrymple et al. |
| 7,271,133 | B2 | 9/2007 | Weaver et al. |
| 7,299,874 | B2 | 11/2007 | Welton et al. |
| 7,303,018 | B2 | 12/2007 | Cawiezel et al. |
| 7,395,861 | B2 | 7/2008 | Caveny et al. |
| 7,435,293 | B2 | 10/2008 | Caveny et al. |
| 7,589,048 | B2 | 9/2009 | Eoff et al. |
| 2001/0034333 | A1 | 10/2001 | Kosak |
| 2006/0283592 | A1 | 12/2006 | Sierra et al. |
| 2007/0129261 | A1 | 6/2007 | Caveny et al. |
| 2009/0093550 | A1 * | 4/2009 | Rolfes et al. ............... 514/772.7 |
| 2009/0181866 | A1 | 7/2009 | Reddy et al. |
| 2011/0073006 | A1 * | 3/2011 | Jalota et al. ..................... 106/35 |
| 2012/0067581 | A1 * | 3/2012 | Auzerais et al. ........... 166/308.1 |

FOREIGN PATENT DOCUMENTS

| | | | |
|---|---|---|---|
| EP | 0323627 | A2 | 7/1989 |
| EP | 0520690 | A2 | 12/1992 |
| EP | 0950420 | A2 | 10/1999 |
| EP | 0950420 | A3 | 1/2001 |
| JP | 61044744 | A | 3/1986 |
| WO | 2006013190 | A1 | 2/2006 |
| WO | 2010065780 | A1 | 6/2010 |
| WO | WO 2013/068771 | * | 5/2013 |

OTHER PUBLICATIONS

CTD, Inc., Cyclodextrin Resource, "About Trappsol Cyclodextrins," http://www.cyclodex.com/about.asp?page_id=26&n=24, Dec. 31, 2007, p. 1-2.

CTD, Inc., Cyclodextrin Resource, "Chemically Modified Cyclodextrins," http://www.cyclodex.com/about.asp?page_id=3&n=3, Dec. 31, 2007, p. 1-7.

CTD, Inc., Cyclodextrin Resource, "Hydroxypropyl Beta Cyclodextrin," http://www.cyclodex.com/about.asp?page_id=4&n=4, Dec. 31, 2007. p. 1-7.

CTD, Inc., Cyclodextrin Resource, "Making Solutions," http://www.cyclodex.com/about.asp?page_id=28&n=26, Dec. 31, 2007, p. 1-2.

CTD, Inc., Cyclodextrin Resource, "Natural Cyclodextrins," http://www.cyclodex.com/about.asp?page_id=2&n=2, Dec. 31, 2007, p. 1-5.

CTD, Inc., Cyclodextrin Resource, "Patent Status," http://www.cyclodex.com/about.asp?page_id=9&n=9, Dec. 31, 2007, p. 1-2.

CTD, Inc., Cyclodextrin Resource, "Physico-Chemical Information," http://www.cyclodex.com/about.asp?page_id=27&n=25, Dec. 31, 2007, p. 1-4.

Halliburton brochure entitled, "Halad®—344: Fluid Loss Additive," Product Data Sheet, Aug. 2007, p. 1-2.

Halliburton brochure entitled, "HR-800™: Cement Retarder," Product Data Sheet, Sep. 2007, p. 1-2.

Halliburton brochure entitled, "SCR-100™: Cement Retarder," Product Data Sheet, Aug. 2007, p. 1-2.

Halliburton brochure entitled, "SSA-2™: Coarse Silica Flour," Product Data Sheet, Aug. 2007, p. 1-2.

Halliburton brochure entitled, "WG-11™: Gelling Agent," Product Data Sheet, Oct. 2007, p. 1-2.

Hercules, Inc., "Use of Anionic Wetting Agents to Improve the Thickening Efficiency of NATROSOL® PLUS HMHEC, Grade 330," May 1987, p. 1-5.

Hercules, Inc., "Product Data: NATROSOL® PLUS HMHEC, Grade 330," Sep. 1998, p. 1-2.

Keif, S. et al., "Expanding Applications for Viscoelastic Surfactants," Oilfield Review, 2004, p. 10-23.

Wikipedia, "Cyclodextrin," http://en.wikipedia.org/wiki/Cyclodextrin, Dec. 31, 2007, p. 1-4.

Office Action dated Jun. 7, 2010 (15 pages), U.S. Appl. No. 12/009,027 filed Jan. 16, 2008.

Office Action (Final) dated Oct. 1, 2010 (9 pages), U.S. Appl. No. 12/009,027 filed Jan. 16, 2008.

Advisory Action dated Dec. 14, 2010 (3 pages), U.S. Appl. No. 12/009,027 filed Jan. 16, 2008.

Office Action dated Mar. 17, 2011 (11 pages), U.S. Appl. No. 12/009,027 filed Jan. 16, 2008.

Office Action (Final) dated Jun. 14, 2011 (11 pages), U.S. Appl. No. 12/009,027 filed Jan. 16, 2008.

Advisory Action dated Jun. 30, 2011 (3 pages), U.S. Appl. No. 12/009,027 filed Jan. 16, 2008.

Office Action dated Aug. 30, 2011 (12 pages), U.S. Appl. No. 12/009,027 filed Jan. 16, 2008.

Notice of Allowance dated Nov. 30, 2011 (8 pages), U.S. Appl. No. 12/009,027 filed Jan. 16, 2008.

Notice of Allowance dated Dec. 27, 2011 (10 pages), U.S. Appl. No. 12/009,027 filed Jan. 16, 2008.

Sigma-Aldrich, "Maltodextrin dextrose equivalent", http://www.sigmaaldrich.com/catalog/product/aldrich/419699?lang=en&region=US, 3 pages.

* cited by examiner

WELLBORE SERVICING COMPOSITIONS AND METHODS OF MAKING AND USING SAME

FIELD

This disclosure relates to servicing a wellbore. More specifically, it relates to servicing a wellbore with cement compositions comprising retarders and methods of making and using same.

BACKGROUND

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Cementitious slurries can set very rapidly, e.g., within a few minutes at elevated temperatures with the rate of reaction increasing as the temperature increases. As such, the thickening times of the compositions may be unacceptably short to allow them to be pumped to their desired downhole locations, making the use of such compositions in well cementing a challenge. For example, the drill pipe or the tool used to lower the piping in the wellbore may be cemented in place, causing delay in the completion of the wellbore. One method commonly employed to lengthen the thickening time of cementitious compositions is to introduce set retarders into the compositions, thereby delaying the time to setting of the cement. However, the effectiveness of many set retarders decreases with increasing temperature requiring the use of multiple retarders at varying concentrations. Thus, an ongoing need exists for set retarder compositions that function at elevated temperatures.

SUMMARY

Disclosed herein is a method of servicing a wellbore in a subterranean formation comprising preparing a wellbore servicing fluid comprising cement, an aqueous fluid, and a cyclodextrin, a cyclodextrin derivative, or combination thereof; placing the wellbore servicing fluid in the wellbore and allowing the fluid to set.

Also disclosed herein is a wellbore servicing fluid comprising cement, aqueous fluid, and a cyclodextrin, cyclodextrin derivative, or combination thereof.

The foregoing has outlined rather broadly the features and technical advantages of the present disclosure in order that the detailed description that follows may be better understood. Additional features and advantages of the invention will be described hereinafter that form the subject of the claims of the disclosure. It should be appreciated by those skilled in the art that the conception and the specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims.

DETAILED DESCRIPTION

Disclosed herein are wellbore servicing fluids (WSF) and methods of making and using same. In an embodiment, the WSF comprises a cementitious material and a cyclodextrin. The cyclodextrin may function to extend the thickening time of the cementitious composition wherein the thickening time refers to the time required for the composition to achieve 70 Bearden units of Consistency (Bc). Consistency is a measure of the pumpability of a cement slurry measured in Bearden units (Bc), and when a cement slurry reaches a Consistency of 70 Bc, it is no longer considered a pumpable slurry.

Figure 1:
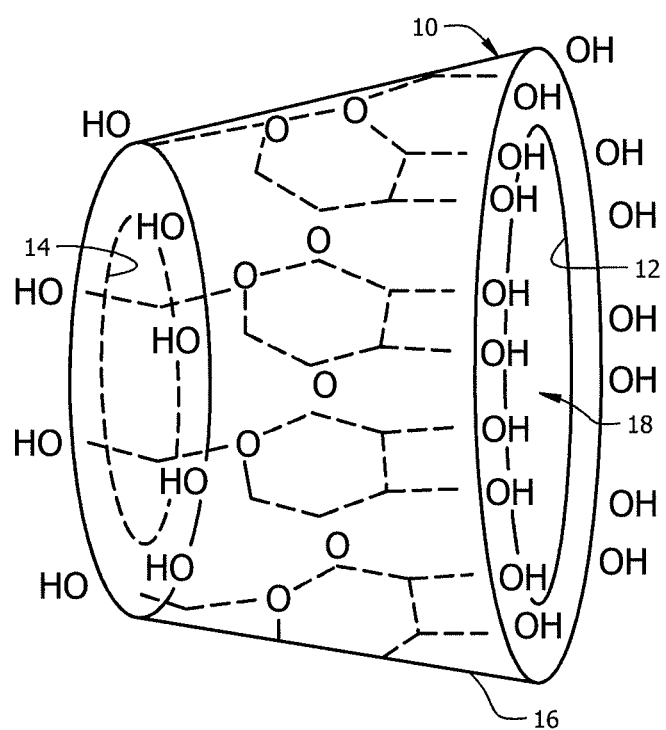
FIG. 1 is a depiction of γ-cyclodextrin.

In an embodiment, the WSF comprises a cyclodextrin, an inclusion complex thereof, or a derivative thereof. Generally, cyclodextrin is thought to be a cyclic oligosaccharide comprising at least 6 glucopyranose units joined by α-(1,4) glycosidic linkages. While cyclodextrins may have up to 150 or more glucopyranose units, the more common cyclodextrins comprise 6, 7, or 8 (α, β, and γ, respectively) glucopyranose units joined by α-(1,4) glycosidic linkages. Cyclodextrins comprising 6-8 glucopyranose units can be represented as toroids as depicted in FIG. 1. Referring to FIG. 1, γ-cyclodextrin is represented as toroid 10 with a larger opening 12 and a smaller opening 14 of toroid 10 representing the secondary and primary hydroxyl groups, respectively. In general, the exterior 16 of toroid 10 may be sufficiently hydrophilic for the cyclodextrin to possess some water solubility. Internal cavity 18 of toroid 10 is generally apolar or relatively more hydrophobic and less hydrophilic than the exterior of the molecule and, thus, may be attractive to hydrophobic or lipophilic molecules. For example, the internal cavity (such as internal cavity 18) of the cyclodextrin or a cyclodextrin derivative may be capable of hosting a hydrophobic portion of a "guest" compound to form an inclusion complex therewith. As used herein, the term "inclusion complex" generally refers to the complex formed with the cyclodextrin functioning as a "host" to a "guest" compound that is contained or bound, wholly or partially, within the internal cavity of the cyclodextrin.

In some embodiments, the WSF comprises a cyclodextrin derivative. Any suitable methodology may be used in the preparation of a cyclodextrin derivative. For example, cyclodextrin derivatives may be prepared by introducing different functional groups into the cyclodextrin molecule by reaction with the primary hydroxyl and/or secondary hydroxyl groups. Because each type of hydroxyl group present in the cyclodextrin moiety may display a different reactivity, derivatizing cyclodextrins may result in an amorphous mixture that includes numerous isomers of different substituted cyclodextrin derivatives, for example when all the available hydroxyl groups are not completely derivatized. It is contemplated that compositions comprising a mixture of cyclodextrin derivatives are suitable for use in the present disclosure.

In an embodiment, derivatization of the cyclodextrin is carried out under conditions that result in some portion of the cyclodextrin remaining underivatized. For example, the reaction may be carried out to result in partial derivatization of the cyclodextrin such that some portion of the free hydroxyl groups in a cyclodextrin molecule remains underivatized. In an embodiment, the average degree of derivatization is less than about 3 per glucopyranose ring. In an embodiment, a cyclodextrin derivative contains at least one underivatized hydroxyl group per toroid ring.

Examples of cyclodextrin derivatives suitable for use in the present disclosure include, but are not limited to: (1) acylated cyclodextrin containing acetyl, propionyl, butyryl, or other suitable acyl groups; (2) hydroxyalkylated cyclodextrin containing hydroxyethyl, hydroxypropyl, or other suitable hydroxy-alkyl groups; (3) carboxylated cyclodextrin containing carboxymethyl, carboxyethyl, or other suitable carboxyalkyl groups, and (4) alkylated cyclodextrin containing methyl, ethyl, propyl, benzyl, or other suitable alkyl groups. In an embodiment, the cyclodextrin derivative comprises a glucosyl or maltosyl moiety such as glucosyl cyclodextrins and maltosyl cyclodextrins. Non-limiting examples of cyclodextrin derivatives suitable for use in the present disclosure include methyl cyclodextrins, hydroxyethyl cyclodextrins, hydroxypropyl cyclodextrins, 2-hydroxyethyl cyclodextrins, carboxymethyl cyclodextrins, carboxyethyl cyclodextrins, glucosyl-$\alpha$-cyclodextrin, maltosyl-$\alpha$-cyclodextrin, glucosyl-$\beta$-cyclodextrin, maltosyl-$\beta$-cyclodextrins, methyl-$\beta$-cyclodextrin, 2-hydroxypropyl-$\beta$-cyclodextrin, hydroxyethyl-$\beta$-cyclodextrin, 2-hydroxypropyl-$\gamma$-cyclodextrin, or combinations thereof.

In an embodiment, the WSF comprises a cyclodextrin derivative comprising an oligomerized or polymerized cyclodextrin such as cyclodextrin dimers and cyclodextrin trimers. Cyclodextrin dimers generally include two cyclodextrin molecules covalently coupled or crosslinked together. Cyclodextrin trimers generally include three cyclodextrin molecules covalently coupled or crosslinked together. Polymerized cyclodextrins generally include a unit of 10 or more cyclodextrin molecules covalently coupled or crosslinked together. Non-limiting examples of oligomerized and/or polymerized cyclodextrins suitable for use in the present disclosure include those containing carboxymethyl cyclodextrins, glucosyl cyclodextrins, maltosyl cyclodextrins, hydroxypropyl cyclodextrins, and 2-hydroxypropyl cyclodextrins. Cyclodextrins and cyclodextrin derivatives are widely commercially available and may be obtained from companies such as CTD, Inc., High Springs, Fla.

Hereinafter, the disclosure will refer to the use of cyclodextrins in the WSF although cyclodextrin derivatives of the type disclosed herein are also contemplated for use in the fluid. In an embodiment, cyclodextrin is present in the WSF in an amount of from about 0.1 wt. % to about 5.0 wt. % based on the weight of cement (bwoc), alternatively from about 0.1 wt. % to about 4 wt. % or alternatively from about 0.1 wt. % to about 3.0 wt. %. In an embodiment, cyclodextrin functions to retard the setting of the WSF over the disclosed concentrations.

In an embodiment, the WSF comprises a cementitious material such as a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements such as Sorel cements, fly ash cement, zeolite cement systems, cement kiln dust cement systems, slag cements, micro-fine cement, metakaolin, and combinations thereof. Examples of such materials are disclosed in U.S. Pat. Nos. 6,457,524; 7,077,203; and 7,174,962, each of which is incorporated herein by reference in its entirety. The WSF may comprise cementitious material in an amount of from about 10 wt. % to about 85 wt. %, alternatively from about 40 wt. % to about 75 wt. %, alternatively from about 50 wt. % to about 70 wt. % by weight of the WSF.

The WSF may include a sufficient amount of an aqueous fluid (e.g., water) to form a pumpable cementitious slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement, alternatively from about 36 to about 66 percent by weight of cement. The cementitious slurry may have a density of from about 7 pounds per gallon (ppg) to about 20 ppg, alternatively from about 10 ppg to about 18 ppg, or alternatively from about 13 ppg to about 17 ppg.

In an embodiment, the WSF may further comprise one or more additives or modifying agents as deemed necessary to impart desired physical properties. Such additives may include but are in no way limited to resins, latex, stabilizers, silica, microspheres, aqueous superabsorbers, viscosifying agents, suspending agents, dispersing agents, salts, accelerants, surfactants, retardants, defoamers, settling-prevention agents, weighting materials, vitrified shale, gas migration control additives, formation conditioning agents, or other additives or modifying agents, and/or combinations thereof. Effective amounts of these additives may be included singularly or in combination using any suitable methodology.

In an embodiment, a WSF of the type described herein comprises cementitious material, water, and a cyclodextrin all of the type and all present in amounts previously described herein. Alternatively, a WSF of the type described herein comprises cementitious material, water, and a $\beta$-cyclodextrin. A WSF containing cementitious material, water, and a cyclodextrin is hereinafter designated WSF-X.

The components of the WSF-X may be combined in any order desired by the user to form a slurry that may then be placed into a wellbore and allowed to set. The components of the WSF-X may be combined using any mixing device compatible with the composition, for example a bulk mixer or a recirculating mixer. In some embodiments, the WSF-X is formed by premixing the cyclodextrin with the cementitious material prior to the addition of other components of the WSF-X. For example, a method of preparing the WSF-X may comprise dry blending a cementitious material with a cyclodextrin both of the type described previously herein. In an embodiment, the cementititous material and cyclodextrin are contacted with any other dry components of the WSF-X prior to the introduction of a liquid component. Alternatively, cyclodextrin can be added to mix water prior to the addition of solid cement blend.

In an embodiment, the thickening time of the WSF-X varies linearly as a function of the cyclodextrin concentration such that the WSF-X displays changes in thickening time that are on approximately the same order of magnitude of the cyclodextrin concentration changes. For example, at a specified temperature within the herein disclosed ranges, doubling the concentration of cyclodextrin in the WSF-X may approximately double the thickening time of the WSF-X. Alternatively, tripling the concentration of cyclodextrin in the WSF-X may approximately triple the thickening time of the WSF-X. In an embodiment, at higher temperature, doubling or tripling the cyclodextrin concentration may increase the thickening time by from about four to about twelve times the original value. Herein, higher temperatures refer to a temperature range of from about 180° F. to about 500° F., alternatively from about 200° F. to about 450° F., or alternatively from about 250° F. to about 400° F.

The ratio of change in thickening time (in hours) to change in cyclodextrin concentration (% by weight of cement) may be obtained graphically by the slope of the graph in which thickening time is plotted as a function of cyclodextrin concentration. In an embodiment, the thickening time, in hours, of the WSF-X displays a responsiveness at 250° F. to the concentration of cyclodextrin (% by weight of cement) that is equal to or less than about a factor of 10, alternatively equal to or less than about a factor of 8, or alternatively equal to or less than about a factor of 3. In an alternative embodiment, the WSF-X displays a thickening time that varies by equal to or less than about 1000% with a change in cyclodextrin concentration of about 100%, alternatively equal to or less than about 800%, or alternatively equal to or less than about 300%.

In an embodiment, the cyclodextrin may display an operational temperature of greater than about 250 degrees, alternatively greater than about 300 degrees, or alternatively greater than about 375 degrees Fahrenheit. Herein, the operational temperature refers to the temperature range over which the cyclodextrin may function as a set retarder with a predictable thickening time response for a specified change in temperature at a fixed cyclodextrin concentration. The thickening time response to cyclodextrin concentration at a specified temperature (i.e., the ratio of change in thickening time (in hours) as a function of change in temperature at a specified cyclodextrin concentration) may be obtained graphically by the slope of the graph in which thickening time is plotted as a function of temperature or change in temperature. In an embodiment, the thickening time, in minutes, of the WSF-X displays a responsiveness to the temperatures (in Fahrenheit), within the operational window, at a concentration of 2.2% cyclodextrin by weight of cement that is equal to or less than about a factor of 10 minutes per degree increase in temperature, alternatively equal to or less than about a factor of 8 minutes per degree increase in temperature, or alternatively equal to or less than about a factor of 3 minutes per degree increase in temperature.

The WSF-X may exclude conventional set retarders as are known in the art. In such embodiments, the cyclodextrin may function as a primary set retarder which results in the WSF-X having a thickening time of from about 3 hours to about 20 hours, alternatively from about 3 hours to about 15 hours, or alternatively from about 3 hours to about 12 hours at a temperature in the range of equal to or less than about 400° F.; alternatively equal to or less than about 300° F.; alternatively equal to or less than about 250° F., or alternatively from about 200° F. to about 400° F. In an embodiment, the cyclodextrin acts as the sole set retarder in the WSF-X at temperatures equal to or less than about 400° F. As will be understood by one of ordinary skill in the art, at higher temperatures (e.g., greater than about 300° F.) conventional set retarders may display a reduced effectiveness in prolonging the thickening times of the cement slurries. Consequently, conventional cement slurries may contain more than one type of set retarder with the set retarders having different operational windows. Compositions of the type disclosed herein (i.e., WSF-X) which employ cyclodextrins as the set retarder may display a broad operational window thereby avoiding the use of multiple set retarders. For example, cyclodextrin may function to retard a WSF-X in a temperature range of from about 80° F. to about 400° F., alternatively from about 80° F. to about 350° F., alternatively from about 200° F. to about 400° F., or alternatively from about 100° F. to about 300° F. The operational window is typically associated with the particular wellbore servicing operation being carried out. For example, the temperature of the well in addition to the depth of the well will influence the length of time it will take to pump and safely place the slurry in the zone of interest. For example, the length of time it will take to pump and safely place the slurry in the zone of interest may be in the range of from about 2 to about 8 hrs or from about 4 to about 10 hrs. In an embodiment, the cyclodextrin allows the slurry to remain pumpable at the bottom hole circulating temperature of the well and the depth of the well to which the slurry needs to be pumped.

In an embodiment, the WSF-X may comprise one or more additional retarders, such as for example tartaric acid or sodium pentaborate. It is contemplated such compositions may be designed by one of ordinary skill in the art with the benefits of this disclosure to meet one or more user and/or process desired needs.

In an embodiment, the WSF-Xs may be employed in well completion operations such as primary and secondary cementing operations. The WSF-X may be placed into an annulus of the wellbore and allowed to set such that it isolates the subterranean formation from a different portion of the wellbore. The WSF-X thus forms a barrier that prevents fluids in the subterranean formation from migrating into other subterranean formations. Within the annulus, the WSF-X also serves to support a conduit, e.g., casing, in the wellbore. In an embodiment, the wellbore in which the WSF-X is positioned belongs to a multilateral wellbore configuration. It is to be understood that a multilateral wellbore configuration refers to a primary wellbore with one or more secondary wellbore branches radiating from the primary borehole.

In secondary cementing, often referred to as squeeze cementing, the sealant composition may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

The WSF-X may be introduced to the wellbore to prevent the loss of aqueous or non-aqueous drilling fluids into loss-circulation zones such as voids, vugular zones, and natural or induced fractures while drilling. In an embodiment, the WSF-X is placed into a wellbore as a single stream and activated by downhole conditions to form a barrier that substantially seals loss circulation zones. In such an embodiment, the WSF-X may be placed downhole through the drill bit forming a composition that substantially eliminates the lost circulation. Methods for introducing compositions into a wellbore to seal subterranean zones are described in U.S. Pat. Nos. 5,913,364; 6,167,967; and 6,258,757, each of which is incorporated by reference herein in its entirety.

The WSF-X, after hardening, may form a non-flowing, intact mass with good strength and capable of withstanding the hydrostatic pressure inside the loss-circulation zone. Said WSF-X may plug the zone and inhibit the loss of subsequently pumped drilling fluid thus allowing for further drilling.

In an embodiment, the cyclodextrin included in the WSF-X may function as a dispersant which displays an improved dispersing ability when compared to an otherwise similar wellbore servicing fluid lacking cyclodextrin. In an embodiment, the dispersing ability of the cyclodextrin results in a reduction in viscosity of the WSF of equal to or greater than about 15%, alternatively equal to or greater than about 30%, or alternatively equal to or greater than about 40% when compared to an otherwise similar wellbore servicing fluid lacking cyclodextrin at a specified shear rate. Herein, the dispersing ability is measured by obtaining FANN viscosmeter readings at room temperature or higher for speeds of 3, 6, 30, 60, 100, 200, 300, and 600 rpm.

In an embodiment, the WSF-X displays right angle set. Herein, right angle set refers to the near right angle increase in viscosity (or consistency) shown in a plot of viscosity (or consistency) over time for the WSF-X. Specifically, it refers to the ability of the slurry to exhibit a relatively constant viscosity for a period of time after they are initially prepared and while they are being placed in their intended locations in the wellbore, i.e., during the period when the slurry is in motion. Eventually, the cement compositions (i.e., WSF-X) quickly set such that the viscosity (or consistency) increases from about 35 Bc to equal to or higher than 70 Bc in equal to or less than about 60 minutes, alternatively equal to or less than about 50 minutes, alternatively equal to or less than about 40 minutes, alternatively equal to or less than about 30 minutes, alternatively equal to or less than about 20 minutes, alternatively equal to or less than about 10 minutes, alternatively equal to or less than about 1 minute. This sudden jump in viscosity may be very desirable in preventing unwanted events such as gas or water migration into the slurry because it indicates the quick formation of impermeable mass from a gelled state after placement.

EXAMPLE

The following examples are given as particular embodiments of the disclosure and to demonstrate the practice and advantages thereof. It is understood that the examples are given by way of illustration and are not intended to limit the specification or the claims in any manner.

Example 1

The effects of including a cyclodextrin of the type described herein on a cement slurry were investigated. Specifically, a 15.8 pound per gallon (ppg) cement slurry containing β-cyclodextrin, 56 wt. % water, 100 wt. % class G cement, 35 wt. % SSA-2 and 0.5 wt. % HALAD-344 was prepared by dry blending β-cyclodextrin, SSA-2, and HALAD-344 and then mixing with water. The weight percentages given are by weight of cement. SSA-2 coarse silica flour is a sand weight additive and HALAD-344 fluid loss additive is a fluid loss control material both of which are commercially available from Halliburton Energy Services, Inc. The thickening times of the slurry as a function of temperature and the concentration of β-cyclodextrin was determined. These results are presented in Table 1.

TABLE 1

| Temperature (° F.) | β-cyclodextrin (wt. %) | Thickening Time (Hour:min.) |
|---|---|---|
| 220 | 0.4 | 7:53 |
| 250 | 0.7 | 4:14 |
|  | 1.1 | 7:32 |
|  | 1.3 | 10:30 |
| 300 | 1.6 | 9:36 |
| 350 | 1.8 | 8:19 |
|  | 2.2 | 11:52 |
| 375 | 2.2 | 5:31 |

TABLE 1-continued

| Temperature (° F.) | β-cyclodextrin (wt. %) | Thickening Time (Hour:min.) |
|---|---|---|
| 400 | 2.2 | 3:16 |
|  | 2.4 | 3:48 |

Figure 2:
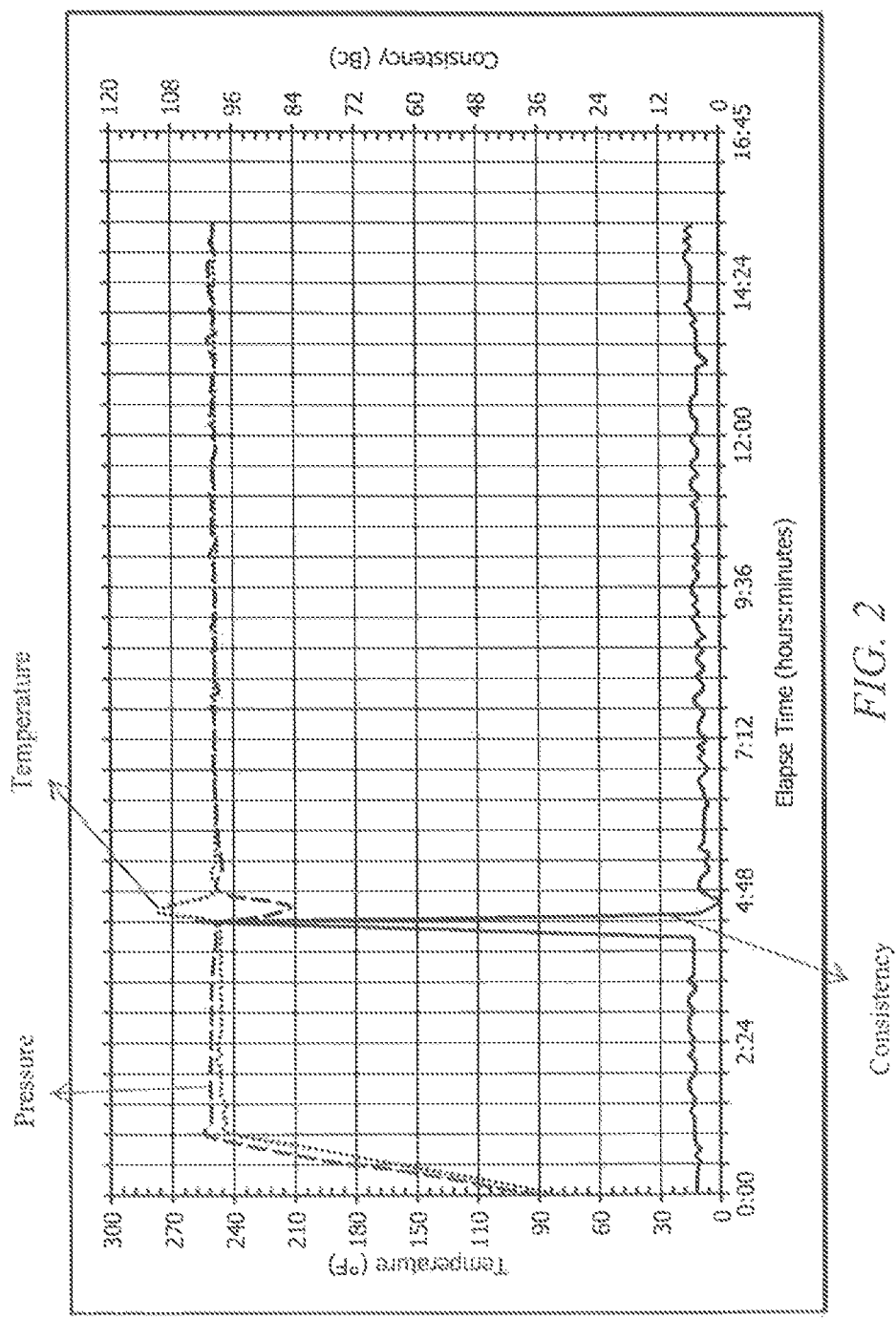
FIGS. 2 and 3 are thickening time plots for the samples from example 1.
Figure 3:
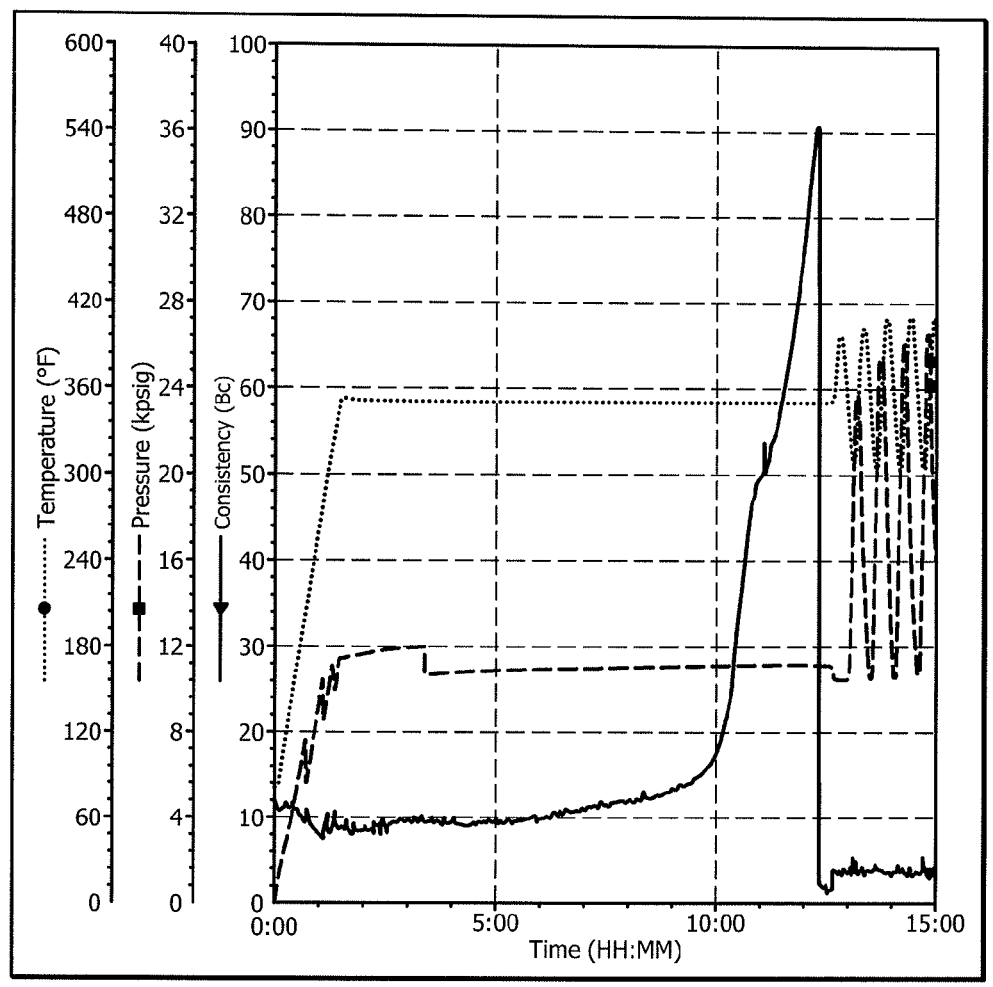

The results demonstrate that β-cyclodextrin functions as an effective set retarder over a wide temperature range (e.g., from 220° F. to 400° F.) and that the thickening time can be varied by varying the concentration of β-cyclodextrin. Thickening time plots of the slurry containing 0.7 wt. % β-cyclodextrin at 250° F. and the slurry containing 2.2 wt. % β-cyclodextrin at 350° F. are presented in FIGS. 2 and 3 respectively. The observed relatively long thickening time of 7 hrs and 53 min at 220° F. even at a low β-cyclodextrin concentration of 0.4% bwoc indicates that at low temperatures, for example in the range of 80° F. to 180° F., the concentrations of the retarder required to observe a reasonable thickening times will be very low (for example, less than 0.1%) to allow for accurate weight measurements. In such situations, the retarder can be diluted with inert materials such as silica or gypsum in any ratio that allows for increased bulk of the material for accurate weight measurements.

The compressive strength of samples set at 250° F. was investigated using an Ultrasonic Cement Analyzer (UCA). Herein, the compressive strength is defined as the capacity of a material to withstand axially-directed pushing forces. The samples were of a 16.8 ppg cement slurry containing the indicated set retarder, 56 wt. % water, 100 wt. % class G cement, 35 wt. % SSA-2 and 0.5 wt. % HALAD-344 were prepared by dry blending the set retaarder, SSA-2, and HALAD-344 and then mixing with water. Slurry 1 contained 0.7 wt. % (bwoc) β-cyclodextrin, Slurry 2 contained 1.1 wt. % (bwoc) β-cyclodextrin and Slurry 3 contained 1.1 wt. % (bwoc) SCR-100. SCR-100 is a non-lignosulfate cement retarder commercially available from Halliburton Energy Services, Inc. The results are summarized in Table 2.

TABLE 2

| Slurry No. | Thickening time (Hours:min) | Time @50 psi | Time @500 psi | 24 hour compressive strength (psi) |
|---|---|---|---|---|
| 1 | 2:38 | 3:49 | 4:16 | 4536 |
| 2 | 4:26 | 5:50 | 6:17 | 4776 |
| 3 | 3:06 | 3:44 | 4:18 | 3397 |

Figure 4:
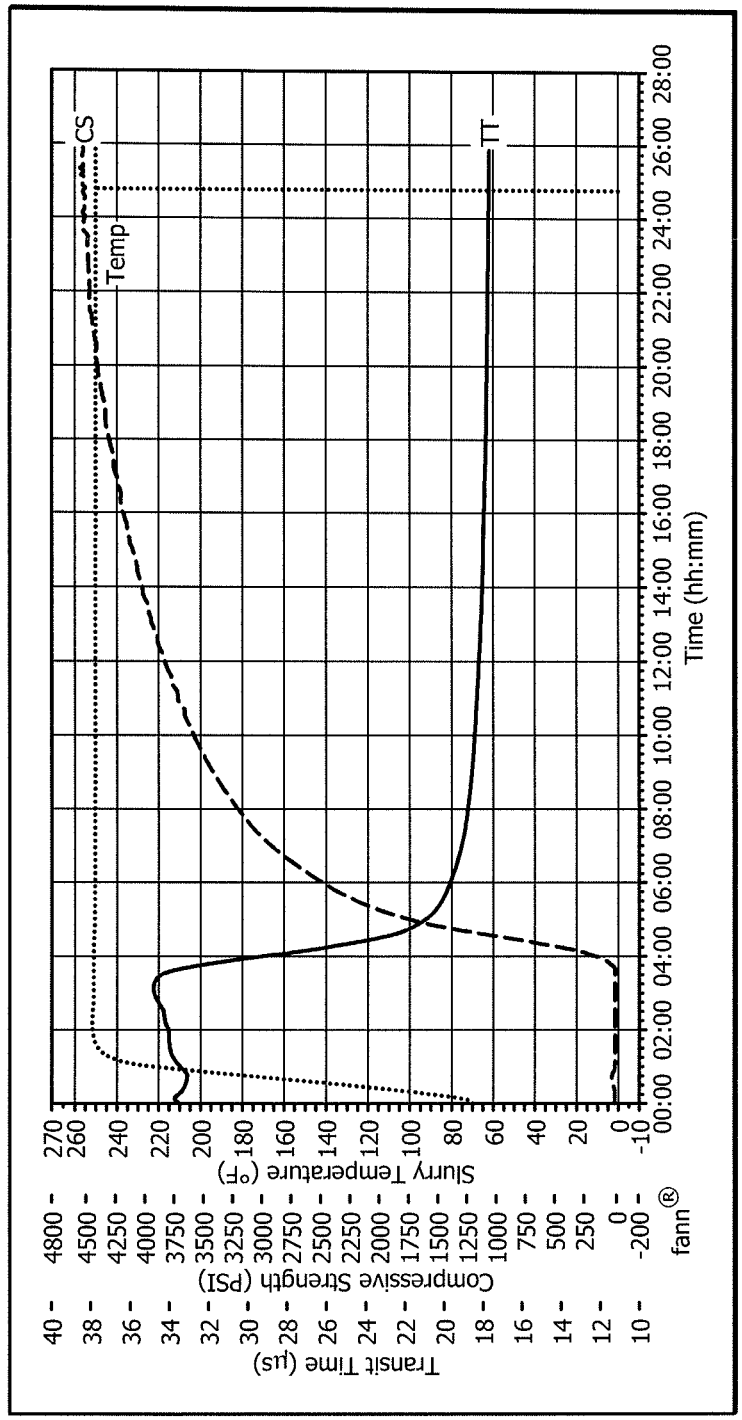
FIGS. 4 and 5 are plots of the compressive strengths for the samples from example 1.
Figure 5:
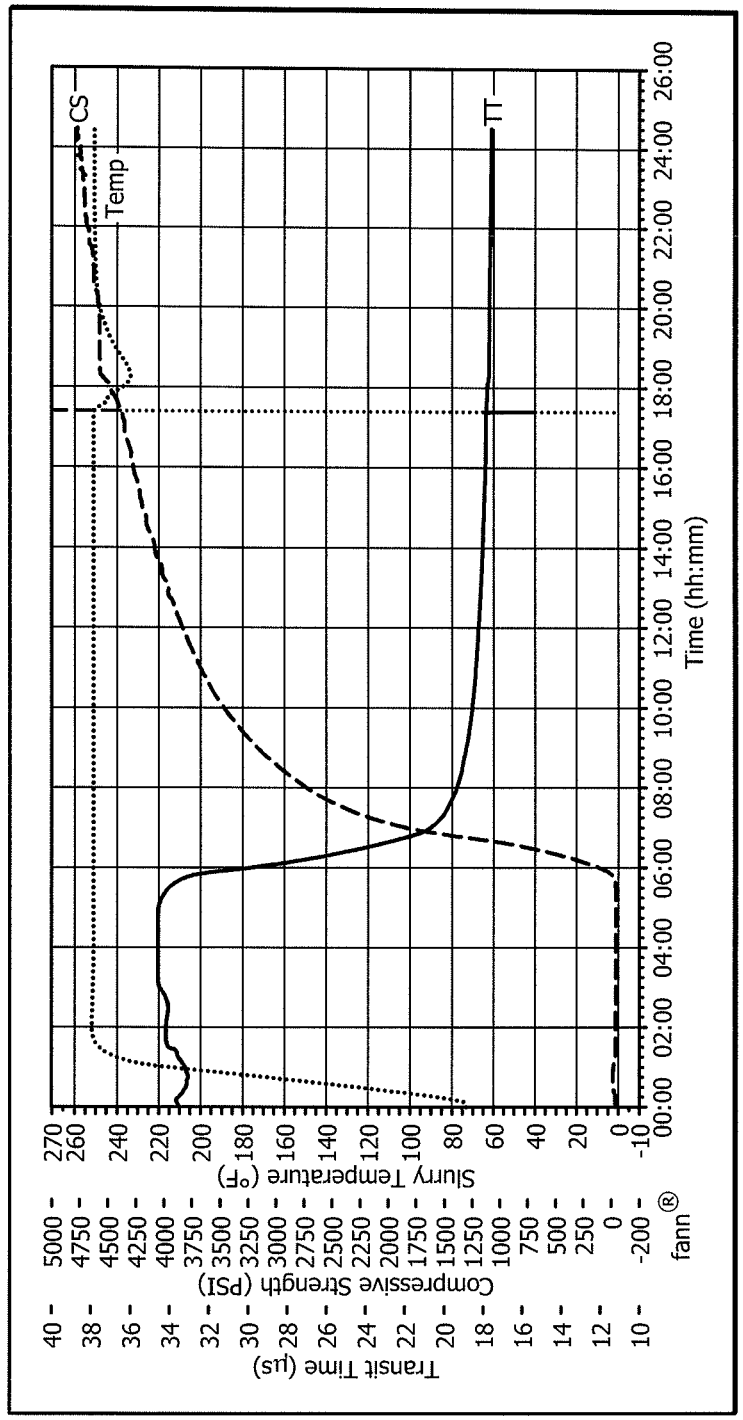

The results demonstrate that inclusion of β-cyclodextrin in the cement slurry did not prevent the development of compressive strength. The time lag observed between the thickening time and the development of 50 psi of compressive strength is advantageously narrow. The cement samples having β-cyclodextrin as the retarder after 24 hours displayed an ultimate compressive strength of greater than 4500 psi (Slurries 1 and 2) while the slurry having SCR-100 as a set retarder displayed an ultimate compressive strength of about 3400 psi (Slurry 3). Representative UCA charts of 16.8 ppg cement slurries set at 250° F. having 0.7 wt. % or 1.1 wt. % β-cyclodextrin are shown in FIGS. 4 and 5 respectively. These figures demonstrate that 50% of the ultimate compressive strength is developed in less than 2 hours from the time the slurry begins to develop gel strength.

Example 2

The ability of cyclodextrins of the type disclosed herein to act as dispersants was investigated by studying the slurry rheology at 140° F. Two slurries of 16.5 ppg density using Class G cement were prepared. Slurry 4 was a comparative cement slurry which contained no β-cyclodextrin. Slurry 5 contained 0.5 wt. % (bwoc) of β-cyclodextrin. The slurries were conditioned at 140° F. for 20 minutes and then the rheological property was measured using a FANN 35 viscometer at 3, 6, 30, 60, 100, 200, 300 and 600 RPM and the results are summarized in Table 3.

TABLE 3

| Slurry No. | Fann Readings | | | | | | | |
|---|---|---|---|---|---|---|---|---|
| | 600 | 300 | 200 | 100 | 60 | 30 | 6 | 3 |
| 4 | 154 | 141 | 122 | 100 | 84 | 53 | 16 | 10 |
| 5 | 82 | 46 | 35 | 24 | 21 | 16 | 10 | 6 |

The results demonstrate that slurries containing β-cyclodextrin displayed a dispersing ability.

Example 3

Figure 6:
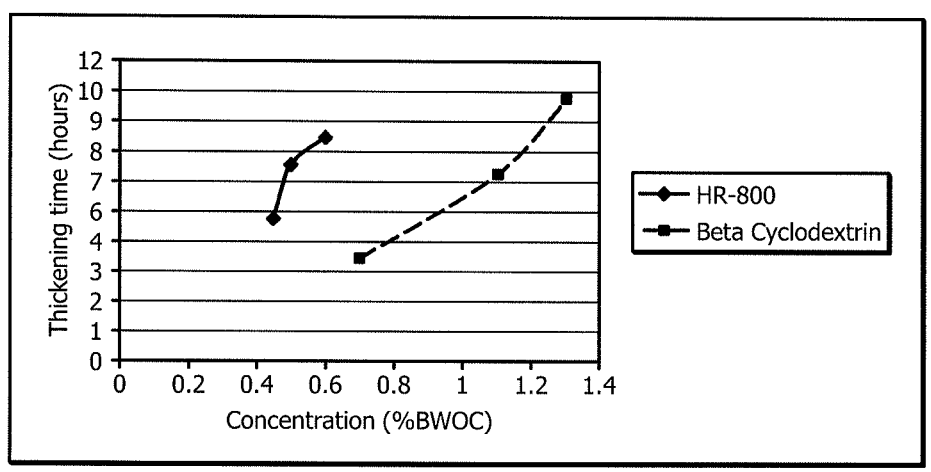
FIG. 6 is a plot of the thickening time as a function of retarder concentration.

The thickening time of the cement slurry as a function of retarder concentration was investigated. Specifically, a base slurry was prepared as described in Example 1. To the base slurry was added the indicated amount of either β-cyclodextrin or HR-800 cement retarder and the thickening time determined. HR-800 cement retarder is a non-lignin, acyclic oligosaccharide type cement retarder commercially available from Halliburton Energy Services, Inc. HR-800 was added as a material diluted with gypsum in a 2:1 ratio. The results are plotted in FIG. 6. The results demonstrate that when the retarder concentration is changed by 0.1% bwoc, the thickening time for HR-800 changes by 2.6 hours whereas samples containing β-cyclodextrin displayed a change in thickening time of about 1.0 hour (slope=10 or factor of 10:1) with the same change in retarder concentration. These results indicate that β-cyclodextrin displays a set retarding ability that is not overly sensitive to concentration which may be advantageously employed in the design of robust cement slurry formulations which provide suitable thickening times even when slight inadvertent changes to the additive concentration occur in the field.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Whenever a numerical range with a lower limit and an upper limit is disclosed, any number and any included range falling within the range are specifically disclosed. In particular, every range of values (of the form, "about a to about b," or, equivalently, "from approximately a to b," or, equivalently, "from approximately α-b") disclosed herein is to be understood to set forth every number and range encompassed within the broader range of values. Use of the term "optionally" with respect to any element of a claim is intended to mean that the subject element is required, or alternatively, is not required. Both alternatives are intended to be within the scope of the claim. Use of broader terms such as comprises, includes, having, etc. . . . , should be understood to provide support for narrower terms such as consisting of, consisting essentially of, comprised substantially of, etc. Also, the terms in the claims have their plain, ordinary meaning unless otherwise explicitly and clearly defined by the patentee.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore in a subterranean formation comprising:
   preparing a wellbore servicing fluid comprising a cementitious material, an
   aqueous fluid, and at least one of a cyclodextrin, a cyclodextrin derivative, and any combination thereof;
   placing the wellbore servicing fluid in the wellbore; and
   allowing the wellbore servicing fluid to set.

2. The method of claim 1 wherein the cyclodextrin is selected from the group consisting of: α-cyclodextrin, β-cyclodextrin, γ-cyclodextrin, and any combination thereof.

3. The method of claim 1 wherein the cyclodextrin derivate is selected from the group consisting of: acylated cyclodextrin, hydroxyalkylated cyclodextrin, carboxylated cyclodextrin, alkylated cyclodextrin, and any combination thereof.

4. The method of claim 1 wherein the cyclodextrin derivatives is selected from the group consisting of: a glucosyl cyclodextrin, a maltosyl cyclodextrin, a methyl cyclodextrin, a hydroxyethyl cyclodextrin, a hydroxypropyl cyclodextrin, a 2-hydroxyethyl cyclodextrin, a carboxymethyl cyclodextrin, a carboxyethyl cyclodextrin, a glucosyl-α-cyclodextrin, a maltosyl-α-cyclodextrin, a glucosyl-β-cyclodextrin, a maltosyl-β-cyclodextrin, a methyl-β-cyclodextrin, a 2-hydroxypropyl-β-cyclodextrin, a hydroxyethyl-β-cyclodextrin, a 2-hydroxypropyl-γ-cyclodextrin, and any combination thereof.

5. The method of claim 1 wherein the wherein the cyclodextrin derivatives is selected from the group consisting of: a cyclodextrin dimer, a cyclodextrin trimer, a polymerized cyclodextrin, and any combination thereof.

6. The method of claim 1 wherein the cyclodextrin comprises β-cyclodextrin.

7. The method of claim 1 wherein the cyclodextrin, cyclodextrin derivative, or combination thereof is present in the wellbore servicing fluid in an amount of from about 0.1 wt. % to about 5.0 wt. % by weight of cement.

8. The method of claim 1 where in the cementitious material comprises at least one cement selected from the group consisting of: a Portland cement, a pozzolana cement, a gypsum cement, a phosphate cement, a high alumina content cement, a silica cement, a high alkalinity cement, a shale cement, an acid/base cement, a magnesia cement, a fly ash cement, a zeolite cement system, a cement kiln dust cement system, a slag cement, a micro-fine cement, a metakaolin, and any combination thereof.

9. The method of claim 1 wherein the cementitious material is present in the wellbore servicing fluid in an amount of from about 10 wt. % to about 85 wt. % by weight of wellbore servicing fluid.

10. The method of claim 1 wherein the aqueous fluid is present in the wellbore servicing fluid in an amount of from about 20 wt. % to about 180 wt. % by weight of cement.

11. The method of claim 1 wherein the wellbore servicing fluid displays a thickening time of from about 3 to about 20 hours at a temperature of less than or equal to about 400° F.

12. The method of claim 1 wherein the wellbore servicing fluid displays a right angle set.

13. The method of claim 1 wherein the thickening time of the wellbore servicing fluid varies linearly as a function of cyclodextrin concentration.

14. The method of claim 1 wherein the wellbore servicing fluid displays an operational window of at least from about 80° F. to about 400° F.

15. The method of claim 1 wherein the wellbore servicing fluid displays a change in thickening time at 250° F. of equal to or less than about a factor of 10 in response to a change in concentration of at least one of the cyclodextrin, the cyclodextrin derivative, and any combination thereof.

\* \* \* \* \*